United States Patent
Sawdy

(10) Patent No.: US 7,651,167 B2
(45) Date of Patent: Jan. 26, 2010

(54) VEHICLE FITTING

(75) Inventor: Michael Barry Sawdy, Hertford (GB)

(73) Assignee: NMI Safety Systems Ltd., London (GB)

( * ) Notice: Subject to any disclaimer, the term of this patent is extended or adjusted under 35 U.S.C. 154(b) by 364 days.

(21) Appl. No.: 10/533,933

(22) PCT Filed: Nov. 7, 2003

(86) PCT No.: PCT/GB03/04827

§ 371 (c)(1),
(2), (4) Date: Oct. 31, 2005

(87) PCT Pub. No.: WO2004/041586

PCT Pub. Date: May 21, 2004

(65) Prior Publication Data
US 2006/0108846 A1    May 25, 2006

(30) Foreign Application Priority Data
Nov. 8, 2002   (GB)  ................................ 0226126.1
Jun. 26, 2003  (GB)  ................................ 0314989.5

(51) Int. Cl.
    B60N 2/02    (2006.01)
    A47C 7/00    (2006.01)
    B60R 21/00   (2006.01)
    A61G 3/00    (2006.01)
    A61G 5/00    (2006.01)
(52) U.S. Cl. .................. 297/383; 297/440.22; 297/473; 297/344.1; 297/DIG. 4
(58) Field of Classification Search ................. 297/484, 297/473, 383, 344.1, 216.1, 337, 354.12, 297/DIG. 4, 440.15, 440.22
See application file for complete search history.

(56) References Cited

U.S. PATENT DOCUMENTS 1,210,223 A  *  12/1916  Silbert ................... 297/452.31

(Continued)

FOREIGN PATENT DOCUMENTS

DE            32 01052 A      7/1983

(Continued)

*Primary Examiner*—Milton Nelson, Jr.
(74) *Attorney, Agent, or Firm*—Egbert Law Offices PLLC

(57) ABSTRACT

A fitting for a vehicle incorporates a backrest and a removable seat squab so that the fitting may be used as a conventional seat, or as a safety fitting to engage a rear of a wheelchair. The backrest is wider at the top than at a lower point, to enable the handles of a relatively narrow wheelchair to pass on either side of the backrest. The backrest is mounted on a supporting frame by a pivotal link mechanisms enabling the backrest to move forwardly so that an electric wheelchair, or other wheelchair that has a rearwardly extending portion towards the back lower part of the wheelchair may be accommodated with the back of the wheelchair in engagement with the backrest of the fitting. The fitting is mounted for lateral movement, the fitting being supported on a base plate which can move laterally on a floor-mounted platform to enable a wheelchair to be manoeuvred easily past the fitting.

20 Claims, 7 Drawing Sheets

U.S. PATENT DOCUMENTS

| | | | |
|---|---|---|---|
| 1,743,377 A * | 1/1930 | Nadell | 297/383 |
| 2,723,710 A * | 11/1955 | Steward et al. | 296/65.03 |
| 2,753,947 A * | 7/1956 | Mach | 180/89.18 |
| 4,551,060 A | 11/1985 | Quercy | |
| 5,120,103 A * | 6/1992 | Kave | 296/19 |
| 6,113,175 A | 9/2000 | Guim et al. | |
| 6,149,528 A * | 11/2000 | Volz et al. | 472/43 |
| 6,254,185 B1 * | 7/2001 | Staehlin et al. | 297/257 |
| 6,533,341 B2 * | 3/2003 | Marinelli | 296/65.16 |
| 6,811,186 B1 * | 11/2004 | Fraley et al. | 280/801.2 |

FOREIGN PATENT DOCUMENTS

| | | |
|---|---|---|
| FR | 2 761 309 A | 10/1998 |
| FR | 2 798 331 A | 3/2001 |
| GB | 2 176 154 A | 12/1986 |
| GB | 2 197 628 A | 5/1988 |
| GB | 2 307 854 A | 6/1997 |
| WO | WO 01 38127 A | 5/2001 |
| WO | WO 02 091979 A | 11/2002 |

* cited by examiner

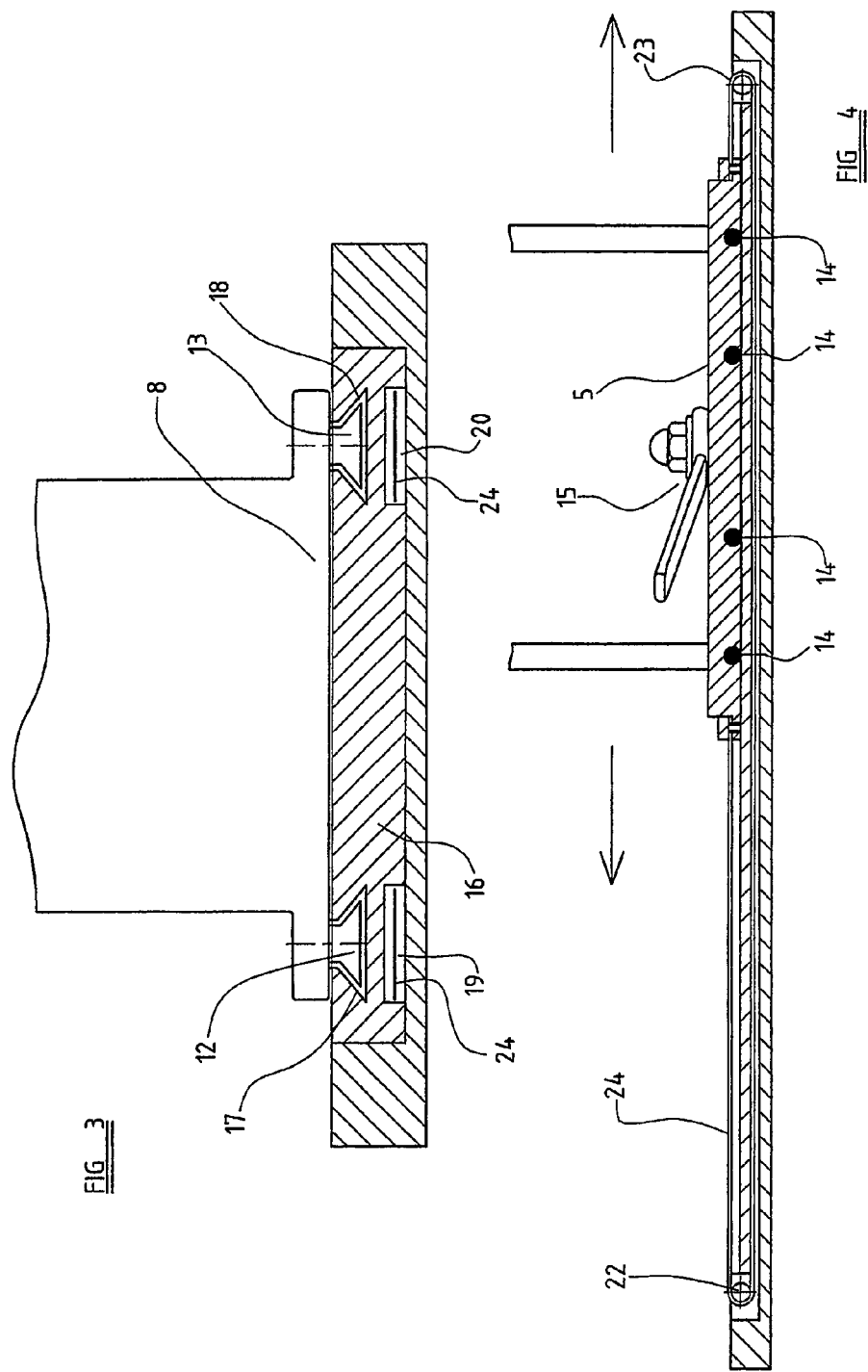

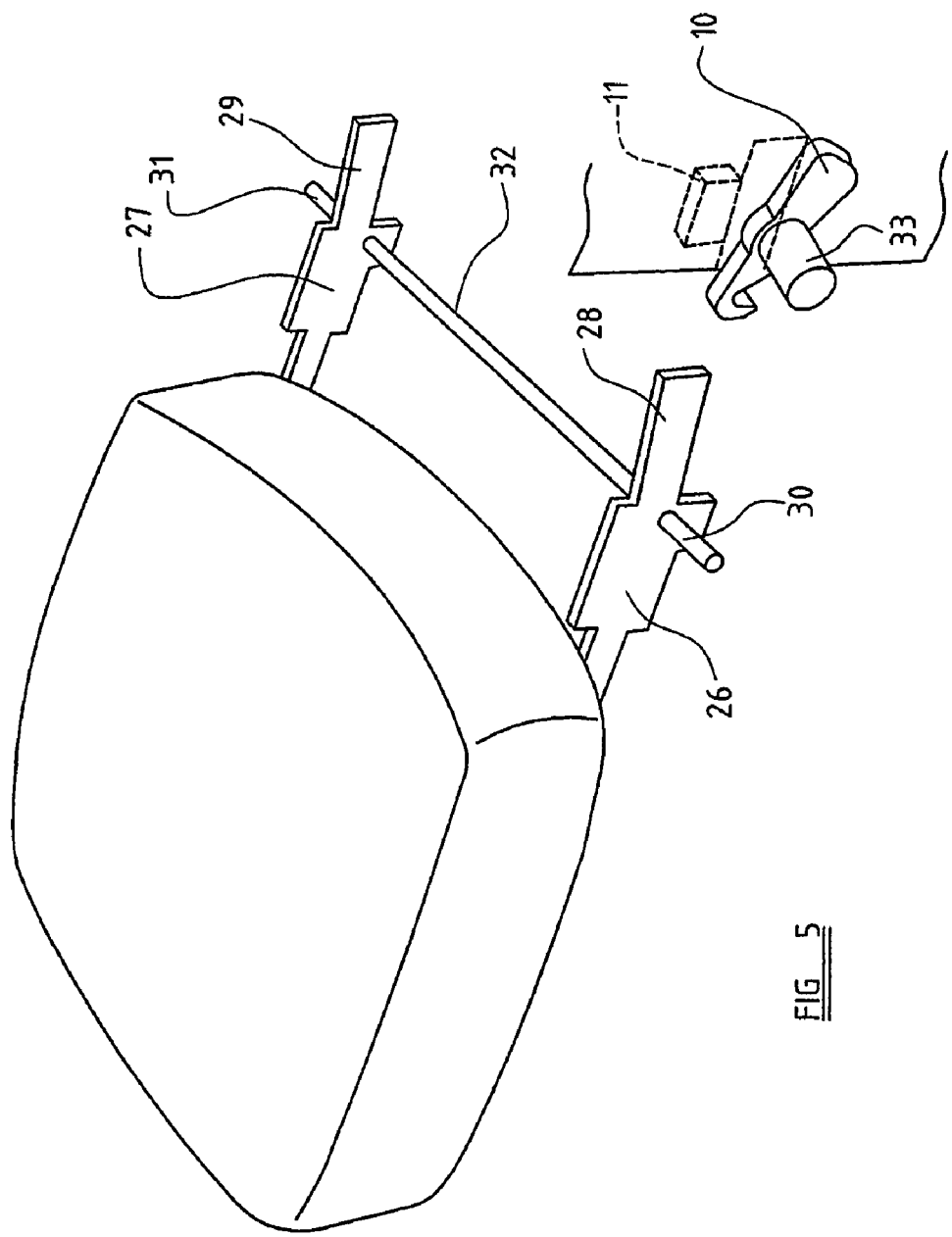
FIG_5

VEHICLE FITTING

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a vehicle fitting and more particularly relates to a vehicle fitting suitable for use in a vehicle, such as, e.g. a minibus or a coach or an ambulance, which is to be utilized by a number of passengers of different types, some of whom may be handicapped.

BACKGROUND OF THE INVENTION

There are many vehicles which are used by a number of passengers, some of whom may be handicapped. Vehicles of this type are frequently operated by Local Councils, or Core Homes and the vehicles may transport patients who have various types of physical and/or mental handicap, some of whom may be in wheelchairs.

The provision of a seat fitting for a vehicle of this type presents the fitting designer with many challenges. An ideal seat fitting has a squab and a backrest in a conventional format so that the seat can be utilized by a seat occupant who has no physical handicap, the seat fitting being configured to provide a degree of protection to the seat occupant if the vehicle is provided in a front impact or in a rear impact.

Also the ideal seat fitting should be adaptable for use with a wheelchair.

A seat fitting of this type may be designed so that the squab of the seat may be moved away from its first or "ordinary" position, with the backrest then being positioned so that the space in front of the backrest is unobstructed. Then a wheelchair may be brought up against the fitting, with a padded part of the fitting lying immediately behind the backrest of the wheelchair, and in such a way that a safety belt provided on the fitting may embrace the occupant of the wheelchair. In this way the safety belt may provide protection in the case of a front impact of the vehicle, and the part of the fitting located behind the backrest of the wheelchair will minimize the risk of the wheelchair occupant moving rearwardly out of the wheelchair in the event that a rear impact should occur.

Wheelchairs come in many different sizes, adult wheelchairs being relatively broad and some child wheelchairs being very narrow. The rearwardly projecting handles on the wheelchairs may thus have very different spacings between them.

The space available within a typical vehicle as used for the transport of handicapped people is generally limited and is often necessary to move a wheelchair, together with the wheelchair occupant, from the rear of the vehicle past a seat fitting of the type described above before the wheelchair can be manoeuver into position with the backrest of the wheel chair located just in front of part of the fitting.

The design of the ideal fitting would take all of these factors into account.

Whilst various fittings have been proposed previously, all commercially available fittings have one or more drawbacks.

BRIEF SUMMARY OF THE INVENTION

The present invention seeks to provides a improved fitting.

According to one aspect of this invention there is provided a fitting for a motor vehicle, the fitting comprising a support configured to be secured to the floor of the vehicle, the support being provided with a seat squab, and being provided with a seat back mounting and backrest, the squab being moveable from an initial position in which the squab projects forward from the support to a position in which the squab does not obstruct the space in front of the backrest, the backrest being mounted to the seat back mounting by a mechanism which enables the backrest to be moved from an initial rearward position to a forward position. Preferably the squab is provided with two mounting fingers and two mounting lugs, the support being provided with formations to receive the fingers and hooks to engage the lugs to removably mount the seat squab.

Conveniently the mechanism connecting the backrest to the seat back mounting incorporates pivotal links.

Advantageously the backrest is connected to the seat back mounting by means of two upper pivotal links and two lower pivotal links, there being one upper and one lower pivotal link to one side of the seat back mounting and another upper and another lower pivot link to the other side of the seat back mounting.

Preferably each pivotal link comprises two straight arms which are pivotally interconnected.

Conveniently the mechanism is an over-dead-center mechanism.

Advantageously the over dead center mechanism comprises a drive bar passing through slots in two spaced apart plates provided on the backrest, the drive bar being mounted on at least one arm which is pivotally mounted to the mounting frame, so that the drive bar executes an arcuate movement.

Conveniently a handle is provided to move the said pivotally mounted arm.

In an alternative embodiment of the invention a motor is provided which is actuable to move the backrest forward.

Conveniently when in the forward position, the backrest can pivot about a horizontal axis.

According to another aspect of this invention, there is provided a fitting for a motor vehicle, the fitting comprising a support, the support being provided with a squab and a backrest to form a seat, the squab being moveable from an initial position in which the squab projects forward from the support to a position in which the squab does not obstruct the space in front of the backrest, the support being mounted for lateral movement.

Preferably the support incorporates a base plate, the base plate being mounted on a platform for lateral movement.

Advantageously the base plate is provided with at least one projection extending downwardly to engage with at least one channel formed in the platform.

Conveniently a band is provided associated with the platform to extend over the or each channel, the or each band extending from the base plate to a guide provided at one end of the respective channel, then passing through a passage extending under the platform, before passing a guide at the other end of the channel and extending back to the other side of the base plate.

In a preferred embodiment of the invention a clamp is provided to clamp the base plate in position.

In one embodiment a motor arrangement is provided to drive the base plate relative to the platform.

Preferably the backrest has a relatively wide upper portion and a relatively narrow lower portion.

According to another aspect of this invention there is provided a fitting for a motor vehicle, the fitting comprising a support supporting a backrest, the backrest being relatively broad at the top and being relatively narrow at a lower position.

Preferably the space in front of the backrest is unobstructed.

Advantageously a removable seat squab is provided which can be mounted in position adjacent the backrest to form a seat.

Preferably at least one seat belt is provided mounted on the fitting and passing through a guide at the top of the backrest.

Conveniently the backrest is mounted on a seat back mounting, and a mechanism is provided to move the backrest forward from an initial position to a second position.

Advantageously the seat back mounting is mounted to the support by a yieldable connection, adapted to yield when subjected to a force in excess of a predetermined force.

Preferably the upper part of the support is a torsion plate and the lower part of the seat back mounting frame is a torsion plate, the torsion plates being interconnected and forming the yieldable connection.

Advantageously the support may be provided with a winch, the winch being provided with at least an elongate flexible member such as a belt or strap provided with a termination configured to engage part of a wheelchair. The winch may be associated with a foot pedal to actuate the winch.

Preferably the fitting is provided with at least one safety-belt. The safety-belt may pass through a guide located adjacent one edge of the upper part of the seat back mounting.

BRIEF DESCRIPTION OF THE SEVERAL VIEWS OF THE DRAWINGS

In order that the invention may be more readily understood, and so that further features thereof may be appreciated, the invention will now be described, by way of example with reference to the accompanying drawings.

FIG. 3 is a sectional view through part of the fitting.

FIG. 4 is another sectional view through part of the fitting.

FIG. 5 is a partial exploded perspective view of part of the fitting.

DETAILED DESCRIPTION OF THE INVENTION

Figure 1:
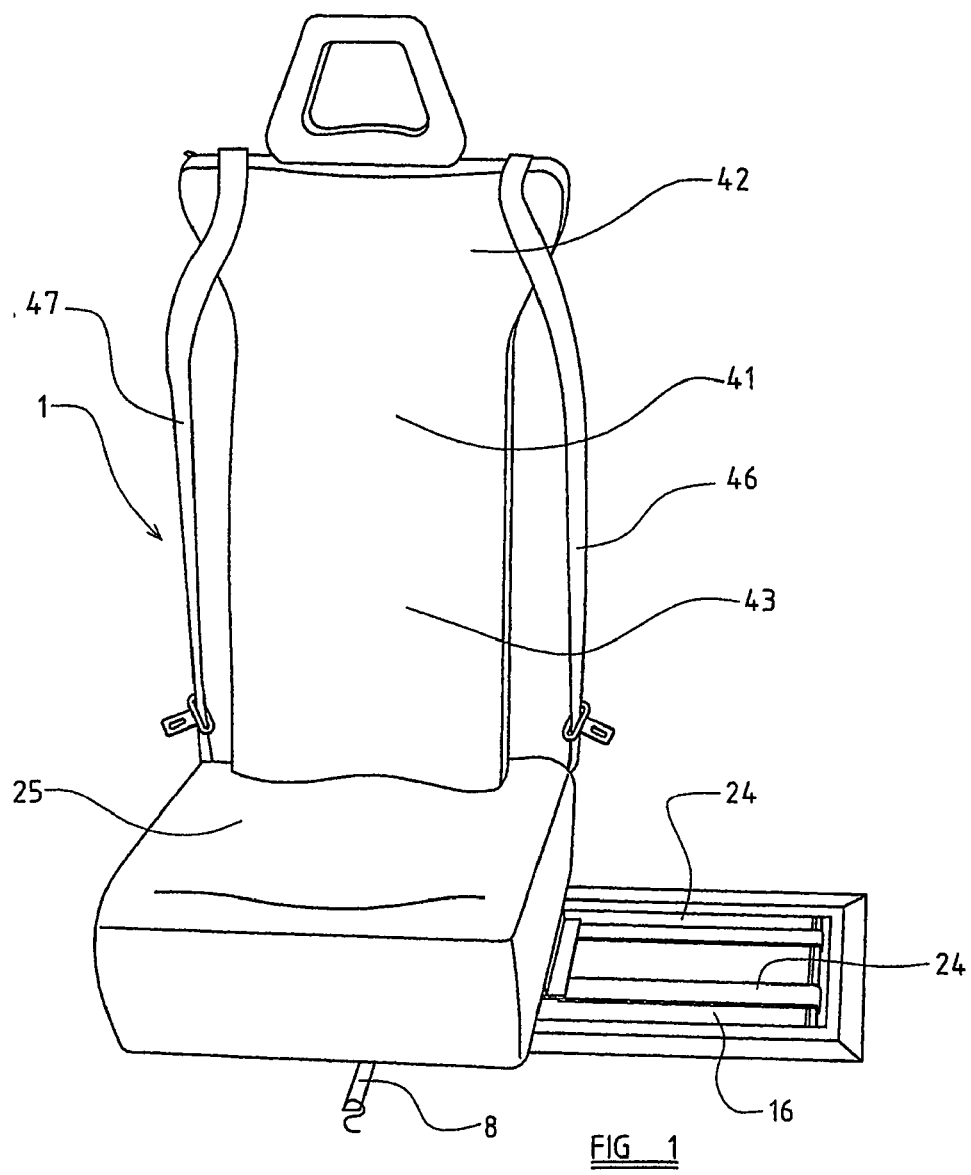
FIG. 1 is a front prospective view of a fitting in accordance with the invention.
Figure 2:
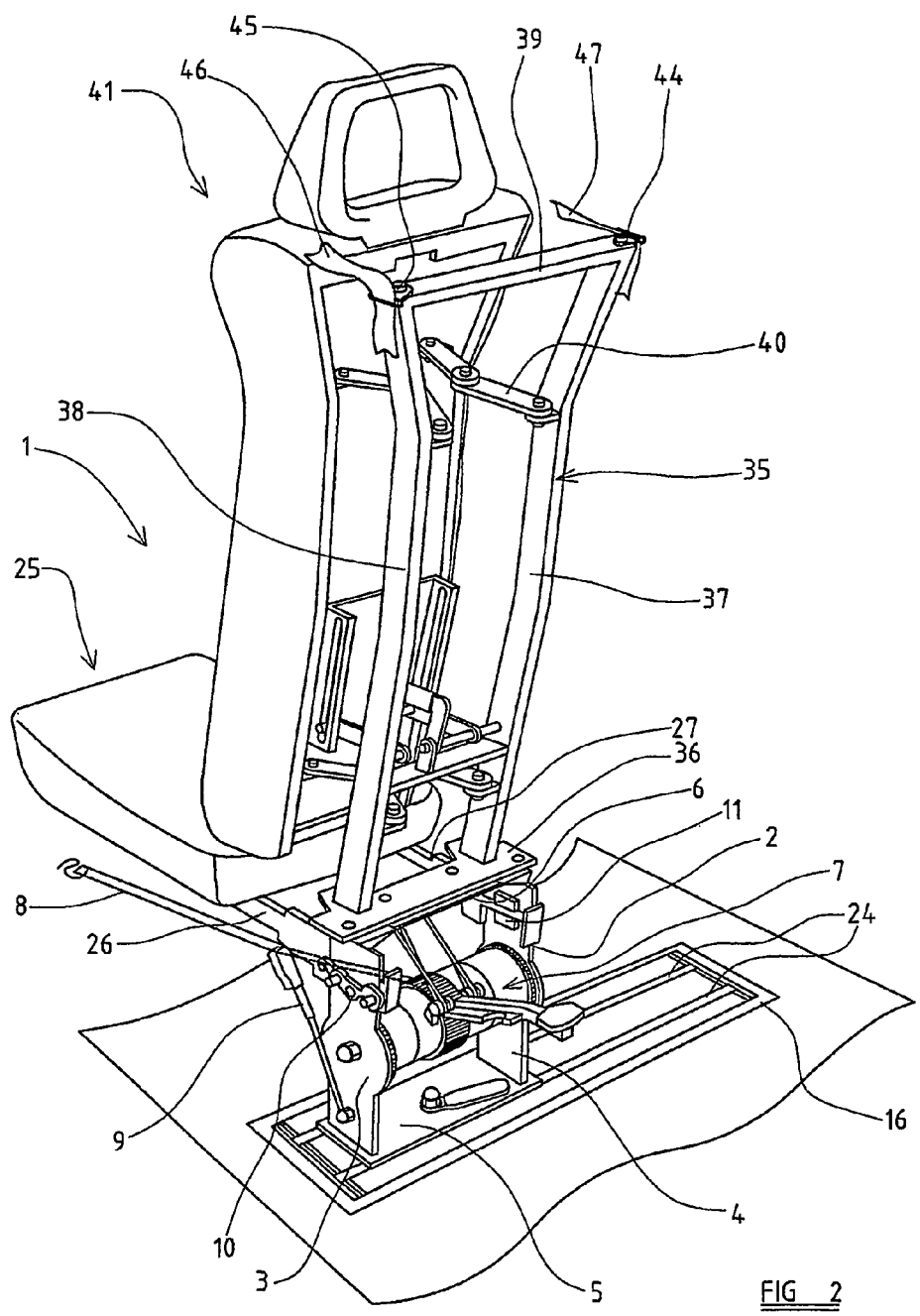
FIG. 2 is a rear perspective view of the fitting of FIG. 1.

Referring to the drawings, FIGS. 1 and 2 illustrate a fitting 1 for use in a motor vehicle. The fitting 1 comprises a support 2 in the form of a support frame having two aside arms 3,4. The lower ends of the side arms are interconnected by a base plate 5. The upper ends of the side arms are interconnected by means of a horizontal torsion plate 6. Extending between the side arms 3,4, is a foot operated winch 7, having a rearwardly extending foot pedal. A strap 8, or the like, is wound on the winch 7. Each side arm 3,4 is provided with a seat-belt retaining buckle 9 and a squab retaining hook 10. The inner face of each side arm 3,4 is provided with a seat-squab-finger engaging formation 11.

The base plate 5 is provided with two depending projections 12, 13, (shown in FIG. 3) each of dovetail form. The base plate 5 is also provided, on its under-surface, with a plurality of rollers 14, and is further provided with a manually actuable clamp 15.

The base plate 5 is mounted for movement across the upper surface of a platform 16, on the rollers 14, the platform 16 being mountable on the floor of a vehicle. The platform 16 is provided, in its upper surface, with two dovetail-shaped channels or grooves 17,18, each groove, accommodating a respective one of the dovetail projections 12, 13 provided on the base plate 5. The under-surface of the platform is provided with recesses 19,20 which extend beneath the dovetail-shaped grooves. At each end of the dovetail-shaped grooves and the underlying recesses a roller or guide 22,23 is provided.

A band 24, such as a band of a rubber material, is connected to the base plate 5 and positioned to overly each of the dovetail grooves 17,18 and to pass through the recesses 19,20. Each band 24 is connected to one side of the platform, extending across the top of the adjacent dovetail-shaped groove 17, around the roller or guide 22 at the end of the groove, to pass through the corresponding recess 19 provided in the under-surface of the platform 16, passing round the other guide or roller 23 at the other end of the groove and being connected to the other side of the base plate 5.

It is to be appreciated, therefore, that the base plate may move laterally, when the clamp 15 has been released, thus moving the entire fitting laterally. A motor may be provided to drive the fitting laterally if required. The bands 24 serve to prevent the ingress of dirt or waste material into the dovetail grooves 17,18.

The lateral movement of the base plate may be achieved, in alternative embodiments of the invention, by alternative mechanisms such as a worm gear mechanism, a cam mechanism or a telescopic tube mechanism. The telescopic tube may be driven hydraulically or pneumatically.

A seat squab 25 is provided to be releasably mounted on the support frame 2. When the seat squab 25 is mounted on the support 2 in an initial position the squab projects forward from the support, adjacent the base of a backrest, which will be described below, and the fitting can be used as a conventional seat. The seat squab 25 (as shown in FIG. 5) has two rearwardly extending support arms 26,27, each support arm terminating with a rearwardly extending engagement finger 28,29. Extending outwardly away from each of the mounting fingers 28,29 is a respective laterally projecting mounting lug 30, 31, the mounting lugs being constituted by opposed ends of a transversely extending rod 32.

As mentioned above, the fingers 28,29 may engage with the corresponding seat-squab-finger engaging formations 11 provided on the inner forces of the side arms 3,4 of the support 2. The hook, 10, provided on each side arm 3,4 of the support may engage the respective lug 30,31 to retain the seat squab in position. Each hook 10 may be provided with a spring-biased plunger 33 adapted to engage with a corresponding aperture formed in the side arm 3 of the frame to retain the hook in the engaging position so that the squab 25 is retained firmly in place on the support 2. It is to be appreciated, therefore, that the squab may be removed from the illustrated position, or returned to the illustrated position with great ease.

A seat back mounting 35 is provided in the form of a seat back mounting frame. The seat back mounting frame has, at its lower end, a horizontal torsion plate 36. The central region of the torsion plate 36 is connected to the central region of the torsion plate 6 provided at the upper part of the support frame 2.

The interconnected torsion plates, 6,36 form a yieldable connection which can yield, absorbing energy, when subjected to a force in excess of a predetermined force. Extending upwardly from the ends of the torsion plate 36 are two spaced-apart side arms 37,38 which have a predetermined spacing. Towards the upper end of the side arms 37,38, the arms diverge outwardly, being interconnected by a top rail 39, the top rail 39 thus having a greater length than the distance between the side arms 37, 38 (over a great part of their height).

A linkage 40, which will be described in greater detail below, is mounted on the seat back mounting frame 35, and supports a backrest 41. The linkage is a mechanism that enables the backrest 41 to be selectively moved from an initial rearward position, in which the backrest is immediately adjacent the seat back mounting frame 35, to a forward position in which the backrest 41 is moved forward and is thus spaced from the seat back mounting frame 35.

The backrest, 41, as can be seen most clearly in FIG. 1, is relatively wide in an upper region 42 thereof, but is relatively narrow in a lower region 43. The width of the upper region 42 of the backrest is substantially equal to the width of the squab 25.

Seat-belt guide loops 44,45 are provided at the opposed ends of the top rail 39 to guide seat-belts 46,47. Each belt may be a three-point belt with a conventional retractor.

Figure 6:
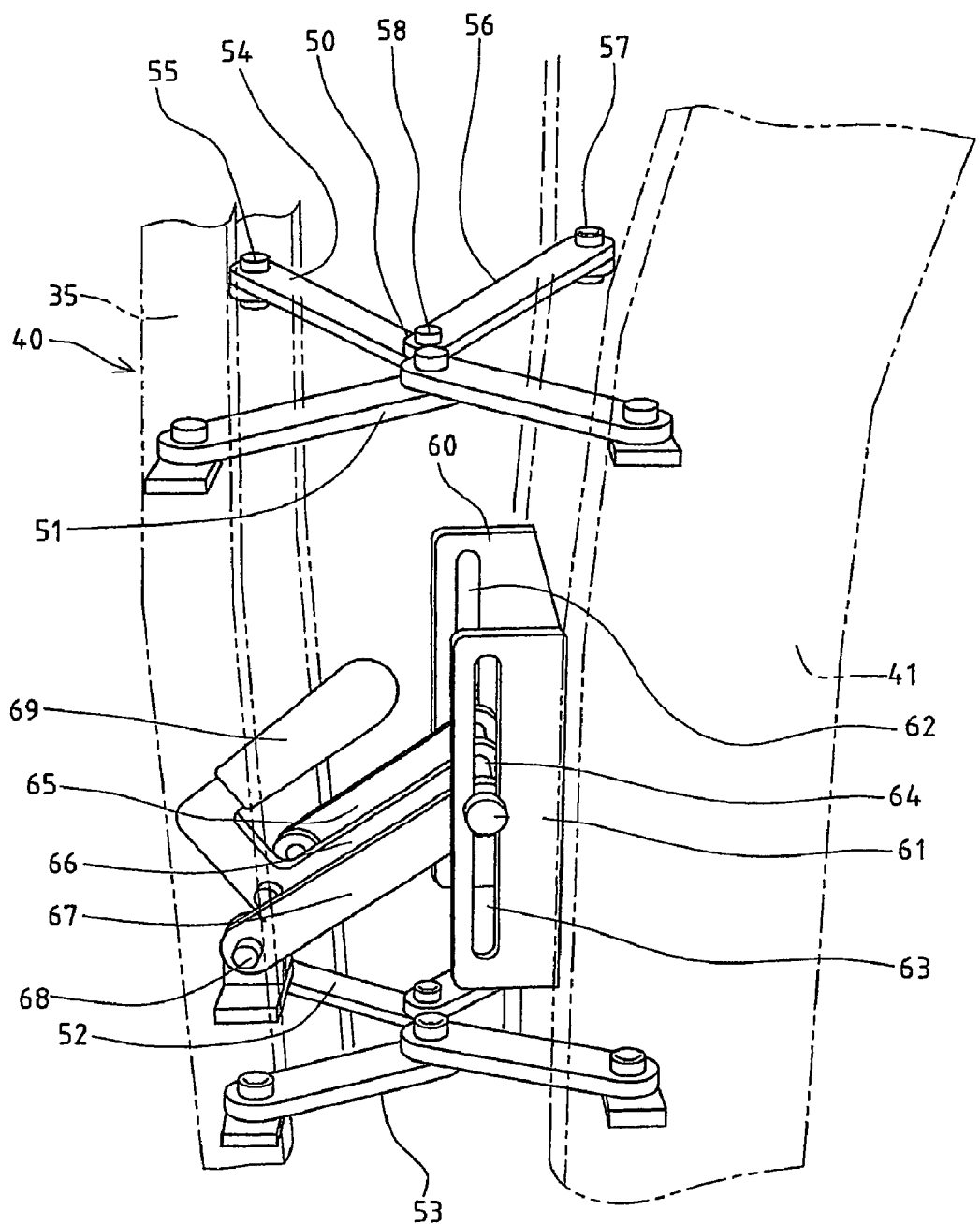
FIG. 6 is a partial perspective view of a further part of the fitting in a first condition.
Figure 7:
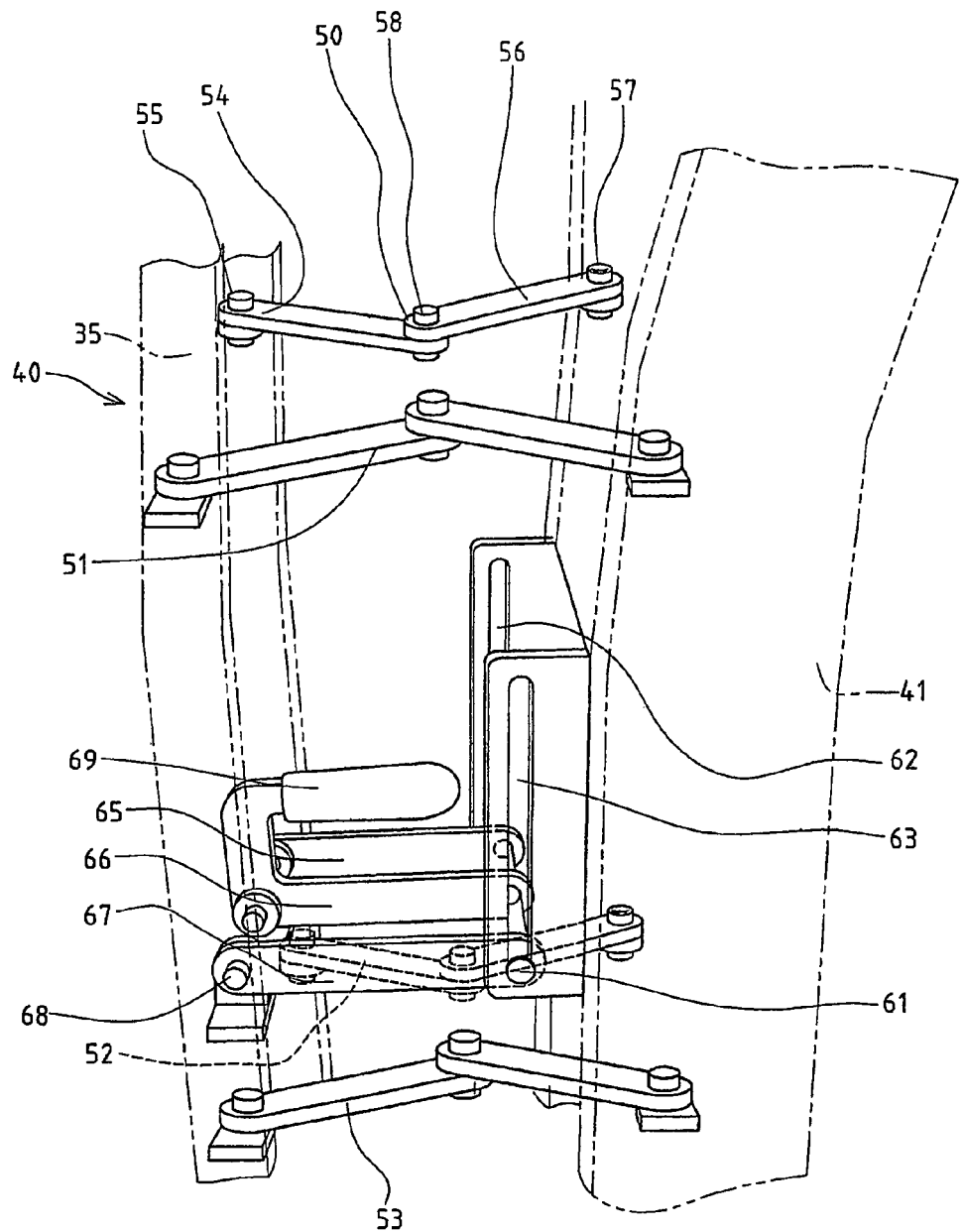
FIG. 7 is another partial perspective view, corresponding to FIG. 6, showing the part of the fitting in a second condition.

Turning now to FIGS. 6 and 7 the linkage 40 comprises two upper pivotal links 50,51 and two lower pivotal links 52,53 which each extend from the seat back mounting frame 35 to the backrest 41. There is one upper link 50 and one lower link 52 on one side 38 of the mounting frame 35, and one upper link 51 and one lower link 53 on the other side 37 of the mounting frame 35. Each link comprises two elongate straight arms, each arm having one end connected either to the seat back support frame 35 or to the backrest 41, the other ends of the arms being pivotally interconnected. Thus, for example, the link 50 comprises a first straight arm 54, having one end 55 pivotally connected to the seat back support frame 35, and another straight arm 56 having one end pivotally connected to the backrest by a pivotal connection 57. The two other ends of the arms are interconnected by a pivotal connection 58. The remaining links are each of an equivalent design.

The four links permit the backrest 41 to be moved forward and rearwardly relative to the seat back mounting frame 35.

A drive arrangement is provided to drive the backrest forward and rearwardly. Whilst, in some embodiments, the drive arrangement may include a motor or the like, in the illustrated embodiment the drive arrangement is manually actuated.

In the illustrated embodiment, as can be seen most clearly in FIGS. 6 and 7, the backrest 41 is provided, on its rear face, with two vertical rearwardly extending flanges 60, 61. Each flange is provided with a vertical slot 62,63.

A horizontal drive rod 64 is provided, opposed ends of the drive rod passing through the vertical slots 62,63. The drive rod 64 is supported by three parallel support fingers 65, 66, 67 which are mounted for pivotal movement on a pivotal support rod 68 which is mounted on the seat back mounting frame 35. The central support finger 66 is formed integrally with a handle 69. By grasping the handle and rotating the handle and the support fingers about the axis of the support rod 68, the drive rod 64 may be driven up and down the vertical slots 62 and 63, effecting an arcuate movement. The effect of this is to move the backrest forward and rearwardly. As the drive rod moves downwardly, so the drive will pass through a "dead center" condition in which the drive rod has a maximum spacing from the mounting frame, and then the drive rod will move slightly back towards the mounting frame as it continues to move downwardly. The handle then occupies a final position, with part of the handle abutting a stop, or with the drive rod engaging the lowermost ends of the slots. With the seat back in this condition any force applied to the seat back tending to drive the seat back rearwardly towards the mounting frame will not enable the seat back to move rearwardly towards the mounting frame, since any rearward movement of the seat back would only be permissible if the drive rod could move further downwardly. The seat back is thus locked in the forward position.

FIG. 6 shows the backrest 41 moved partly forward, from a rearmost position, and FIG. 7 shows the backrest moved fully forward. It is to be appreciated that when the backrest is in the fully forward position, the upper part of the backrest may pivot rearwardly, about the axis defined by the drive rod 64 at the lower-most ends of the slots 62,63, with the upper linkages 50,51 becoming effectively compressed.

Figure 8:
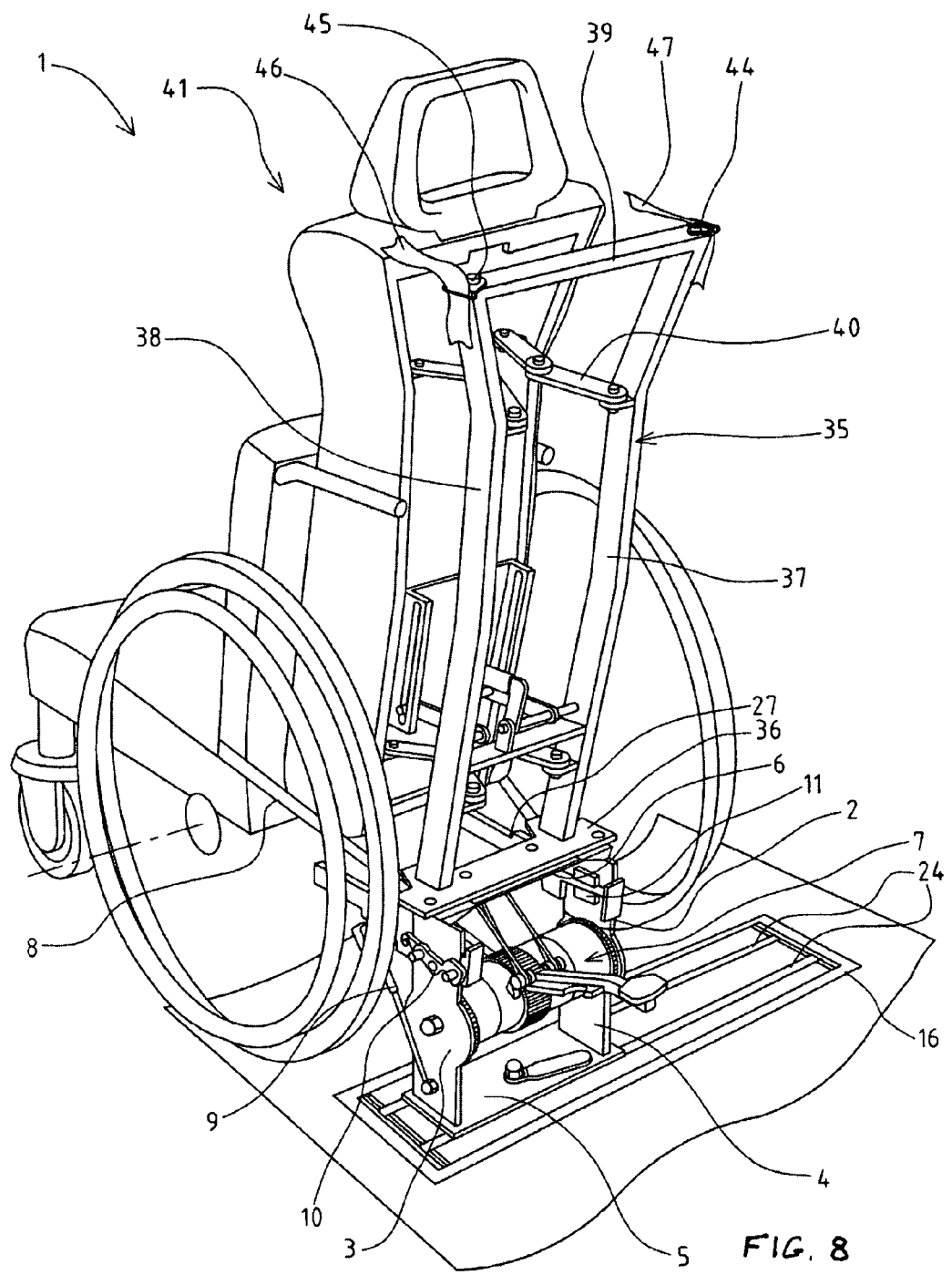
FIG. 8 is a perspective view of a wheelchair as received by the fitting of the present invention.

The fitting as described may be used, when in the condition of FIGS. 1 and 2, as a conventional seat. However, if the fitting is to be used with a wheelchair (as shown in FIG. 8), initially the squab may be removed from the fitting, simply by releasing the hooks 10 and withdrawing the squab 25 from the support. The squab 25 thus does not obstruct the space in front of the back rest 41. If a wheelchair is to be brought into the vehicle from the rear of the vehicle, it may be difficult to manoeuvre the wheelchair past the fitting. The fitting may, in such a circumstance, be moved laterally simply by releasing the clamp 15, and pushing the entire fitting to one side. The base plate 5 will roll over the underlying platform 16 by virtue of the rollers 14. The base plate 5 will be guided by the engagement between the depending dovetail projections 12,13 and the dovetail grooves 17,18. The bands 24 will be moved past the rollers or guides 22,23 as the platform moves, and will cover the otherwise open grooves 17,18. The fitting can be moved to a position where there is sufficient space to maneuver the wheelchair past the fitting.

When the wheelchair has been manoeuver past the fitting, the fitting may be again moved laterally to an appropriate position and may then be clamped in position by means of the clamp 15. The wheelchair may then be moved so that the back of the wheelchair is adjacent the backrest 41 supported on the seat back mounting frame 35. The strap 8 may be attached to the wheelchair, using an appropriate hook or karabiner and the winch 7 may be operated to draw the wheelchair to the fitting. If the wheelchair is an electric wheelchair, or is some other form of wheelchair which has a rearwardly extending projection provided at the lower part of the back of the wheelchair, the backrest 41 may be moved forward relative to the seat back mounting frame 35 by actuating the handle 65. The backrest may thus be moved to a position in which it is located immediately adjacent the back of the wheelchair, with part of the wheelchair extending underneath the forward positioned backrest. The seat-belts 46,47 will be positioned to embrace the occupant of the wheelchair to hold the occupant against the backrest 41. Because the top rail 39 of the seat back mounting frame 35 is relatively wide, as wide as the squab 25, the seat belt guide loops 44,45 are spaced apart sufficiently to guide the seat belts 46,47 over the shoulders of an adult seat or wheelchair occupant.

It is to be appreciated that if the wheelchair is a relatively narrow wheelchair, having rearwardly extending handles which are not spaced very far apart, the handles may, nevertheless, be accommodated to either side of the narrow part 43 of the backrest 41. The backrest 41 will, however, be able to contact the whole of the spine of a seat or wheelchair occupant in the event of a rear impact.

If the vehicle is involved in a front impact the seat belts will restrain the occupant of the wheelchair. In a rear impact the occupant of the wheelchair will be restrained by the seat back, and will thus be prevented from moving rearwardly out of the wheelchair. If a very substantial force is applied to the backrest the torsion plates 6,36 will distort, absorbing energy.

In the present Specification "comprises" means "includes or consists of" and "comprising" means "including or consisting of".

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A fitting assembly for a motor vehicle comprising:
   a support frame suitable for securement to a floor of the motor vehicle, said support frame having a guide at a top thereof;
   a seat squab affixed to said support frame;
   a seat back mounting affixed to said support frame;
   a backrest interconnected to said seat back mounting, said seat squab being moveable between a first position in which said seat squab projects forwardly from said support frame and a second position in which said seat squab does not obstruct a space in front of said backrest;
   a mounting means connecting said backrest to said seat back mounting, said mounting means for enabling said backrest to move from a rearward position to a forward position in which said backrest is moved forwardly so as to be spaced from said seat back mounting; and
   at least one seat belt connected to said support frame, said seat belt passing through said guide.

2. The fitting assembly of claim 1, said seat squab having a pair of mounting fingers and a pair of mounting lugs, said support frame having a pair of formations respectively receiving said pair of mounting fingers and a pair of hooks respectively engaging said pair of mounting lugs.

3. The fitting assembly of claim 1, said mounting means comprising a plurality of pivot links.

4. The fitting assembly of claim 3, said plurality of pivot links comprising a pair of upper pivot links and a pair of lower pivot links, one of each of said pairs of upper pivot links and lower pivot links being affixed to said one side of said seat back mounting, another of each of said pair of upper pivot links and lower pivot links being affixed to another side of said seat back mounting.

5. The fitting assembly of claim 3, each of said plurality of pivot links comprising a pair of straight arms that are interconnected.

6. The fitting assembly of claim 1, said mounting means being an over-dead-center mechanism.

7. The fitting assembly of claim 6, said over-dead-center mechanism comprising:
   a drive bar passing through slots formed in a pair of spaced-apart plates on said backrest, said drive bar being mounted on at least one arm which is pivotally mounted to said support frame, said drive bar movable in an arcuate pattern.

8. The fitting assembly of claim 7, further comprising:
   a handle connected to the arm.

9. The fitting assembly of claim 1, further comprising:
   a motor means operatively connected to said backrest for moving said backrest forwardly.

10. The fitting assembly of claim 1, said backrest pivotable about a horizontal axis when in said first position.

11. A fitting assembly for a motor vehicle comprising:
    a support frame suitable for securement to a floor of the motor vehicle, said support frame having a base plate;
    a seat squab affixed to said support frame;
    a seat back mounting affixed to said support frame;
    a backrest affixed to said seat back mounting, said seat squab being moveable between a first position in which said seat squab projects forwardly from said support frame and a second position in which seat squab does not obstruct a space in front of said backrest, said support frame being mounted on rollers suitable for lateral movement;
    a platform mounted to said base plate, said base plate having at least one projection extending downwardly therefrom, said platform having at least one channel formed therein, the projection being engaged with the channel; and
    a band extending over the channel, the channel having a guide at one end thereof, said band extending from said base plate to said guide, said band passing through a passage formed under said platform.

12. The fitting assembly of claim 11, further comprising:
    a clamp affixed to said base plate so as to hold said base plate in a position.

13. The fitting assembly of claim 11, further comprising:
    a motor connected to said base plate for driving said base plate relative to said platform.

14. The fitting assembly of claim 11, said backrest having a wide upper portion and a narrow lower portion.

15. A fitting assembly for a motor vehicle and a wheelchair that has a pair of handles extending rearwardly of a back thereof, the fitting assembly and wheelchair comprising:
    a backrest having an unobstructed space in front thereof;
    a support frame suitable for securement to a floor of the motor vehicle, said support frame supporting said backrest;
    a seat back mounting affixed to said support frame, said seat back mounting having a guide at a top thereof, said backrest having a broad portion at a top thereof and a narrow portion at a bottom thereof, said back of said wheelchair residing against said backrest, said pair of handles positioned respectively adjacent opposite sides of said narrow portion; and
    at least one seat belt connected to said support frame, said seat belt passing through said guide.

16. The fitting assembly of claim 15, further comprising:
    a seat squab removably mounted to said support frame in a position adjacent said backrest.

17. The fitting assembly of claim 15, said seat belt comprising at least two seat belts mounted to said support frame said guide comprising at least two guides, the seat belts respectively passing through the guides.

18. The fitting assembly of claim 15, said backrest being mounted on said seat back mounting, said fitting assembly further comprising:
    a means for moving said backrest forwardly from a rearward position to a forward position, said backrest being spaced from said seat back mounting in said forward position.

19. The fitting assembly of claim 18, said seat back mounting being mounted to said support frame by a yieldable connection, said yieldable connection suitable for yielding when subjected to a predetermined force.

20. The fitting assembly of claim 19, said support frame having a first torsion plate in an upper part thereof and a second torsion plate in a lower part thereof, said first and second torsion plates being interconnected so as to form said yieldable connection.

* * * * *